United States Patent
Benson

[11] Patent Number: 5,961,754
[45] Date of Patent: Oct. 5, 1999

[54] SLIDER STOPPER HAVING SUCTION CUPS

[76] Inventor: Michele Benson, 412 Malden Dr., Dallas, Tex. 75202

[21] Appl. No.: 08/893,113

[22] Filed: Jul. 15, 1997

[51] Int. Cl.$^6$ .................................................... B60C 27/00
[52] U.S. Cl. ........................... 152/171; 152/231; 152/243; 152/221
[58] Field of Search ..................................... 152/170, 171, 152/172, 185, 221, 222, 231, 243, 223, 224

[56] References Cited

U.S. PATENT DOCUMENTS

| | | | |
|---|---|---|---|
| 2,109,038 | 2/1938 | Pierre | 152/243 |
| 3,797,549 | 3/1974 | Lieberum | 152/175 |
| 4,161,976 | 7/1979 | Schmitt et al. | 152/239 |
| 4,308,906 | 1/1982 | Bula et al. | 152/221 |
| 4,321,955 | 3/1982 | Reiger et al. | 152/171 |
| 4,667,719 | 5/1987 | Masuda | 152/209 R |
| 4,850,410 | 7/1989 | Lew | 152/221 |
| 4,892,127 | 1/1990 | Lew | 152/221 |
| 4,960,160 | 10/1990 | Stacy | 152/221 |

*Primary Examiner*—Russell D. Stormer
*Attorney, Agent, or Firm*—Patent & Trademark Services; Joseph H. McGlynn

[57] ABSTRACT

A net-like device which has plurality of crossed cords or straps that are attached to the outer surface of a vehicle tire. A suction cup is attached where the cords or straps cross each other in order to increase the traction of the vehicle tire.

4 Claims, 1 Drawing Sheet

SLIDER STOPPER HAVING SUCTION CUPS

BACKGROUND OF THE INVENTION

This invention relates, in general, to a vehicle wheel accessory, and, in particular, to a vehicle wheel accessory which will prevent the wheels from slipping on a wet surface.

DESCRIPTION OF THE PRIOR ART

In the prior art various types of anti-skid devices have been proposed. For example, U.S. Pat. No. 4,308,906 discloses a clamping means for attaching a web-like device to the outer surface of a vehicle tire to prevent the tires from slipping on wet surfaces.

U.S. Pat. No. 4,850,410 discloses a continuous snow chain comprises three chains disposed in a zig-zag pattern and connected to each other to be disposed on the outer surface of a vehicle tire.

U.S. Pat. No. 4,892,127 discloses a snow chain with t least three chains to provide diamond shaped openings and which are secured by hooks around the outer surface of a vehicle tire.

U.S. Pat. No. 4,960,160 discloses a series of straps which are secured to the outer surface of a vehicle tire to increase traction.

SUMMARY OF THE INVENTION

The present invention comprises a net-like device which has plurality of crossed cords or straps that are attached to the outer surface of a vehicle tire. A suction cup is attached where the cords or straps cross each other in order to increase the traction of the vehicle tire.

It is an object of the present invention to provide a new and improved traction device for vehicular tires.

It is an object of the present invention to provide a new and improved traction device for vehicular tires which is inexpensive to manufacture.

It is an object of the present invention to provide a new and improved traction device for vehicular tires which can be easily installed.

These and other objects and advantages of the present invention will be fully apparent from the following description, when taken in connection with the annexed drawings.

DESCRIPTION OF THE PREFERRED EMBODIMENT

Figure 1:
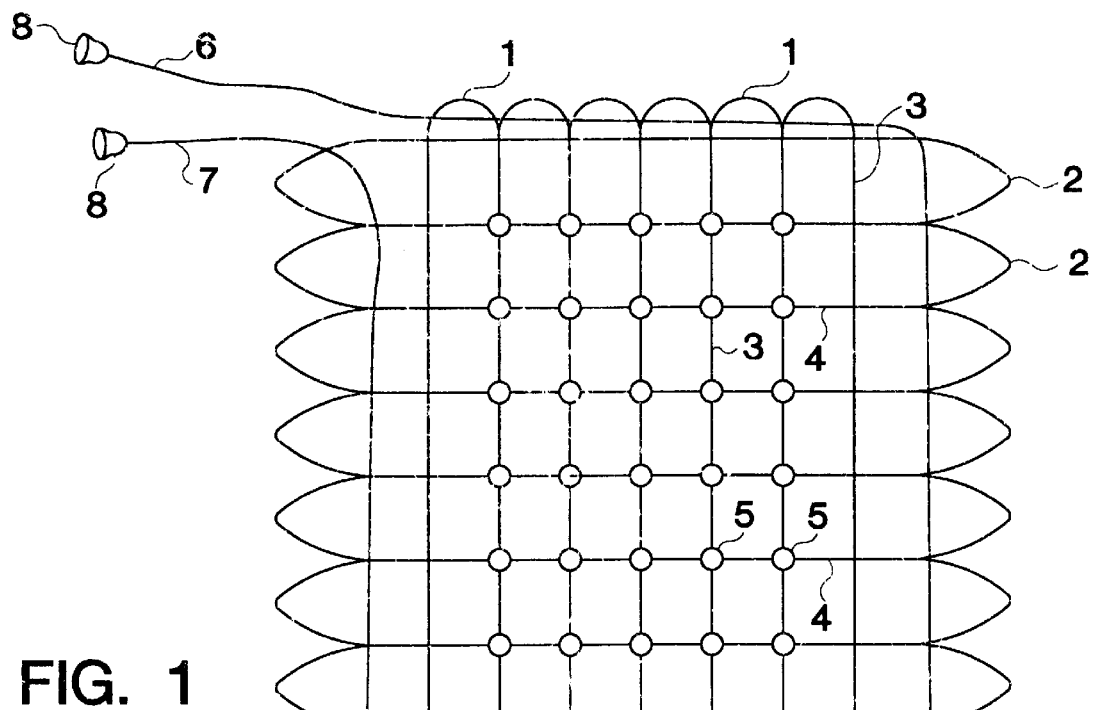
FIG. 1 is a plan view of the present invention.
Figure 2:
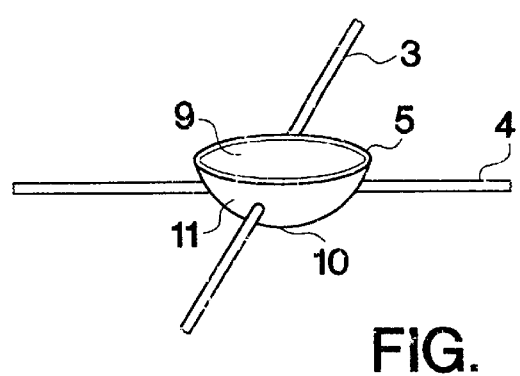
FIG. 2 is a partial view of the present invention showing one of the suction cups attached.

Referring now to the drawings in greater detail, FIG. 1 shows a plan view of the present invention, which comprises a plurality of vertical straps or cords 3 which are crossed by a plurality of horizontal straps 4. The vertical straps or cords 3 are integrally connected to each other at opposite ends by loops 1, and the horizontal straps or cords 4 are integrally connected to each other at opposite ends by loops 2. The plurality of loops and straps make up a web-like structure that will be placed around the outer surface of a vehicle tire, as will be explained below.

The cords or straps 3, 4 can be made from a variety of material such as, but not limited to, nylon. The exact material can vary without departing from the scope of the invention as long as the material is strong enough to withstand the weight of a vehicle and the resultant frictional forces that will be encountered as the tire engages a road surface.

At the point where each horizontal straps or cords 4 crosses over the vertical straps or cords 3, a suction cup 5 is positioned. Each of the suction cups 5 will have an open end 9, a closed end 10, and sides 11. The open end of the suction cups 5 will be positioned on the vehicle tire so that it faces away from the surface of the tire, not shown. That is the closed end of the suction cups 5 will be against the surface of the tire and the open end of the suction cups 5 will face away from the tire and toward the road surface.

The suction cups 5 will be attached to the straps or cords 3, 4 in any conventional manner such as, but not limited to, molding the suction cups 5 around the cords 3, 4. In addition, the suction cups 5 can be made from any durable material that will be strong enough to withstand the weight of a vehicle and the resultant frictional forces that will be encountered as the tire engages a road surface.

A cord having opposite ends 6, 7 will be used to secure the net-like structure to a vehicle tire. Each of the ends can have an enlargement 8 attached thereto, in any conventional manner, in order to make it easier to handle the cord ends. The cord, as shown in FIG. 1 will be passed through the loops 1 attached to the vertical cords or straps 3 and also passed through the loops 2 attached to the horizontal cords or straps 4. Once the net-like structure is wrapped around a tire, the ends of the cords will be pulled tight will compress the net-like structure around the outside of the vehicle tire, and then the ends 6, 7 of the cord can be tied in order to hold the net-like structure in place.

In order to use the present invention, the user will lay the net-like structure on the ground with the open ends 9 of the suction cups 5 facing toward the ground. The vehicle will then be moved until the tire or tires are positioned on the net-like structure. Next, the user will pull the loops 1, 2 up and around the top of the tire by means of the cord ends 6, 7 and then the ends will be tied to hold the net-like structure in place around the tire. If additional tires will have other net-like structures applied thereto, the user can use the same procedure to secure them to additional tires in the same manner.

Due to the fact that the suction cups 5 will engage the road surface between the tire/tires and the road, the suction cups will provide extra traction on wet, slippery surfaces. This will provide the operator of the vehicle with an extra amount of safety while operating his/her vehicle. Also, since the suction cups 5 will extend over the entire surface of the tire/tires, the suction cups will always be engaged with the road surface and there will never be a time when only the tires are engaging the road surface. This will help the operator control his/her vehicle in wet, slippery road conditions.

Although the Slider Stopper and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An anti-slip device for fitting about a vehicle wheel, said device comprising:

a plurality of vertical cords, a plurality of horizontal cords, said vertical and horizontal cords connected together at points in a crossing pattern, a plurality of suction cups having at least one concave side connected at the points where said vertical and horizontal cords cross each other, means for securing said anti-slip device to said vehicle wheel.

2. The anti-slip device for fitting about a vehicle wheel as claimed in claim 1, wherein said horizontal cords are connected together at their ends by loops, and wherein said vertical cords are connected together at their ends by loops.

3. The anti-slip device for fitting about a vehicle wheel as claimed in claim 2, wherein said means for securing said anti-slip device to said vehicle wheel is a cord which is inserted within said loops connecting said horizontal and vertical cords.

4. The anti-slip device for fitting about a vehicle wheel as claimed in claim 1, in combination with a vehicle wheel, wherein said anti-slip device is mounted on said vehicle wheel with said concave sides of said suction cups facing away from said vehicle wheel.

* * * * *